United States Patent [19] [11] 4,260,723
Harada et al. [45] Apr. 7, 1981

[54] METHOD FOR PRODUCING OLEFIN POLYMERS

[75] Inventors: Masato Harada, Kisarazushi; Yoshikatsu Ishigaki, Ichiharashi; Sadahiko Yamada, Ichiharashi; Atsushi Suzuki, Ichiharashi; Jun Masuda, Ichiharashi; Tadamitsu Hamazaki, Ichiharashi; Toshiaki Yoshida, Ichiharashi; Kiyoto Fukuda, Ichiharashi, all of Japan

[73] Assignee: Chisso Corporation, Osaka, Japan

[21] Appl. No.: 51,797

[22] Filed: Jun. 25, 1979

[30] Foreign Application Priority Data

Jun. 27, 1978 [JP] Japan .................................. 53-77777
Jul. 13, 1978 [JP] Japan .................................. 53-85419

[51] Int. Cl.$^3$ ........................... C08F 4/02; C08F 10/00
[52] U.S. Cl. .................... 526/115; 252/429 B; 252/429 C; 526/97; 526/114; 526/116; 526/119; 526/124; 526/125; 526/348.6; 526/351; 526/352; 526/906
[58] Field of Search ............... 526/114, 116, 119, 115, 526/97

[56] References Cited

U.S. PATENT DOCUMENTS

| | | | |
|---|---|---|---|
| 3,900,454 | 8/1975 | Sato et al. | 526/116 |
| 3,987,233 | 10/1976 | Sato et al. | 526/125 |
| 4,027,087 | 5/1977 | Satoh et al. | 526/114 |
| 4,076,922 | 2/1978 | Satoh et al. | 526/119 |
| 4,109,071 | 8/1978 | Buzer et al. | 526/114 |
| 4,154,701 | 5/1979 | Melquist | 526/116 |

*Primary Examiner*—Edward J. Smith
*Attorney, Agent, or Firm*—Fred Philpitt

[57] ABSTRACT

A method for producing α-olefin polymers or copolymers by the use of an improved catalyst having a specific solid product combined with an organoaluminum compound is provided.

The specific solid product (III) is prepared by
  reacting a trivalent metal halide with a specified divalent metal compound to obtain a solid product (I);
  reacting this product (I) with a transition metal compound of 4a group or 5a group of the Periodic Table in the presence of a polysiloxane to obtain a solid product (II); and
  further reacting this product (II) with at least two transition metal compounds of 4a group or 5a group, consisting of at least one member selected from the group (A) consisting of halogen-containing transition metal compounds of 4a group or 5a group, and at least one member selected from the group (B) consisting of halogen-free transition metal compounds of 4a group or 5a group to obtain the solid product (III).

By employing this improved solid product (III) as a catalyst component, it is possible to produce α-olefin polymers or copolymers having a broader molecular weight distribution with a high polymer yield.

9 Claims, No Drawings

METHOD FOR PRODUCING OLEFIN POLYMERS

DESCRIPTION OF THE INVENTION

The present invention relates to a method for producing olefin polymers and also to a solid catalyst component of a catalyst employed therefor.

Olefin polymerization or olefin polymers referred to in the present invention means homopolymerization or homopolymers of α-olefins, and further includes copolymerization or copolymers of α-olefins with a small amount of other α-olefins copolymerizable therewith (including diolefins).

As for catalysts for polymerizing α-olefins such as ethylene, it has heretofore been known that a catalyst obtained by fixing a transition metal compound onto the surface of a magnesium compound such as magnesium chloride, magnesium hydroxychloride, magnesium hydroxide, magnesium oxide, etc. and then combining the resulting material with an organo-aluminum compound is employed for the above-mentioned catalysts. In recent years, as for olefin polymers suitable for the fields of extrusion molding and blow molding, it has been particularly required that such polymers have higher molecular weights (lower melt indexes) and also a superior fluidity at the time of molding. In such a situation, for the above-mentioned Ziegler catalysts, it is possible to improve the fluidity to a certain extent, for example, by combining a component of a catalyst supported on a carrier with mixed organoaluminum compounds or by blending olefin polymers having notably different molecular weights together, but the resulting polymers have been not satisfactory for practical uses.

As for a method for improving the fluidity, a means of broadening the molecular weight distribution has been employed. Olefin polymers having narrower molecular weight distributions are suitable for injection molding or the like, whereas it is preferable for polymers employed for extrusion molding or blow molding or for stretching purpose to have broader molecular weight distributions. If polymers having narrower molecular weight distributions are employed for blow molding or the like, extrusion pressure at the time of molding increases to such an extent that the molding becomes infeasible, and the resulting molded products are extremely injured in the appearance by creation of streaks as well as creeping and blobbing and further, melt fracture. In the case of extrusion molding, the resulting product suffers from fatal bad influence by too much rise of extrusion pressure, reduction of stability of molding etc., thus leading to a remarkable drop of its commodity value. Thus, in order to overcome these drawbacks, it is necessary to broaden the molecular weight distribution of polymers thereby to improve their fluidity at the time of molding, to improve productivity of molding and processing, to provide products having a superior appearance and further, to make it possible to carry out complicated molding and fabrication currently required.

The inventors of the present application have so far studied a catalyst component having as its carrier, a reaction product (which will be hereinafter referred to as solid product (I)) obtained by reacting a trivalent metal halide with a divalent metal hydroxide, oxide or carbonate, a composite compound containing the foregoing compounds, or a hydrate of a divalent metal compound (these compounds being hereinafter abbreviated merely to divalent metal compound). According to the studies, when a usual combination of a solid product obtained by reacting the above-mentioned solid product (I) with one transition metal compound selected from among those of metals of 4a group or 5a group of the Periodic Table, is employed, it is impossible to obtain ethylene polymers having a broad molecular weight distribution which is satisfactory for practical uses. In such a situation, however, the inventors have found that if a combination of two kinds of transition metal compounds is employed in the preparation process of the catalyst component, ethylene polymers having a braoder molecular weight distribution can be obtained. The inventors have made further studies and as a result have found that if two kinds of transition metal compounds are respectively selected from the two groups of specified transition metal compounds, and as the solid product to be reacted therewith, a solid product obtained by a further specified reaction is employed, then it is possible to broaden the molecular weight distribution of polymer while maintaining the polymerization activity of catalyst, and have completed the present invention.

The object of the present invention is to provide a method for producing polymers having a broader molecular weight distribution with a high yield of polymer, and a solid catalyst component of a catalyst employed therefor.

The present invention resides in:

a method for producing α-olefin polymers by the use of a catalyst obtained by:

reacting a trivalent metal halide with a divalent metal hydroxide, oxide, carbonate or a composite compound containing the foregoing compound(s) or a hydrate of a divalent metal compound, to obtain a solid product (I), reacting a transition metal compound of metals of 4a group or 5a group of the Periodic Table with said solid product (I) in the presence of a polysiloxane, to obtain a solid product (II), and further reacting with said solid product (II), at least two kinds of transition metal compounds consisting of at least one kind selected from the group (A) consisting of halogen-containing transition metal compounds of 4a group or 5a group of the Periodic Table (these compounds being hereinafter referred to as halogen-containing transition metal compounds) and at least one kind selected from the group (B) consisting of halogen-free transition metal compounds of 4a group or 5a group of the Periodic Table (these compounds being hereinafter referred to as halogen-free transition metal compounds), to obtain a solid product (III), and combining this solid product (III) with an organoaluminum compound; and the present invention resides also in;

a solid catalyst component comprising said solid product (III).

The above-mentioned solid product (II) employed in the present invention has previously been employed by the present inventors, for an α-olefin polymerization wherein said solid product (II) itself is employed as a solid catalyst component and combined with an organoaluminum (Japanese patent application Nos. 21246/1978 and 21247/1978). In this case, the catalyst has a high polymerization activity, and olefin polymers having a high bulk density can be obtained, but their molecular weight distribution is narrow. Whereas when a reaction product obtained by reacting this solid product (II) with two specified kinds of transition metal compounds is employed as a solid catalyst component, an effect of greatly broadening the molecular weight distribution of polymer is exhibited.

As for catalysts for olefin polymerization, a solid catalyst wherein halogen-containing transition metal compounds and polyalkyl titanates (one kind of transition metal compounds containing no halogen) are employed has been known. Namely Japanese patent application laid-open No. 100984/1976 discloses a catalyst obtained by combining a solid (catalyst) obtained by halogenating a polyalkyl titanate with a halogenating agent (including titanium tetrachloride), and having no carrier as an indispensable constituting element, with an organoaluminum compound. Further, Japanese patent application laid-open No. 24292/1977 discloses a catalyst obtained by combining a solid obtained in the same manner as in said Japanese patent application laid-open No. 100984/1976, a solid obtained by contacting a magnesium-containing solid (carrier) with a titanium halide, and an organoaluminum compound. The present invention is different from the above-mentioned prior inventions at least in that a solid product (II) obtained by reacting a solid product (I) (obtained by reacting a trivalent metal halide with a divalent metal compound) with a transition metal compound in the presence of a polysiloxane is employed as a carrier, which solid product (II) is a solid having a high polymerization activity by itself.

The present invention will be described in more details.

As for the trivalent metal halide, aluminum chloride (anhydrous) and ferric chloride (anhydrous) are mentioned.

As for the divalent metal compound, for example, hydroxides such as $Mg(OH)_2$, $Ca(OH)_2$, $Ba(OH)_2$, $Zn(OH)_2$, $Mn(OH)_2$, $Fe(OH)_2$, $Co(OH)_2$, $Ni(OH)_2$; oxides such as MgO, CaO, BaO, ZnO, MnO, FeO; composite oxides containing a divalent metal oxide such as $MgAl_2O_4$, $Mg_2SiO_4$, $Mg_6MnO_8$; carbonates such as $MgCO_3$, $CaCO_3$, $BaCO_3$, $MnCO_3$; hydrates of halides such as $SnCl_2.2H_2O$, $MgCl_2.6H_2O$, $NiCl_2.6H_2O$, $MnCl_2.4H_2O$, $KMgCl_3.6H_2O$; hydrates of composite compounds consisting of an oxide and a halide such as $3MgO.MgCl_2.4H_2O$; hydrates of composite oxides containing a divalent metal oxide such as $3MgO.2SiO_2.2H_2O$; hydrates of composite compounds consisting of a carbonate and a hydroxide such as $3MgCO_3.Mg(OH)_2.3H_2O$; hydrates of hydroxide-carbonate containing a divalent metal; etc. are mentioned.

For reacting a trivalent metal halide with a divalent metal compound, it is preferable to admix and mill them together in advance in a ball mill for 5–100 hours or in a vibrating mill for 1–10 hours to bring them into a sufficiently mixed state. As for the mixing ratio, usually a range of 0.05–20 in terms of the atomic ratio of divalent metal to trivalent metal may be sufficient, and a preferable range is 0.1–5.0. The reaction temperature is usually 20°–500° C., preferably 50°–300° C. As for the reaction time, 30 minutes–50 hours may be sufficient. Thus, a solid product (I) is obtained.

A transition metal compound is then reacted with this solid product (I) in the presence of a polysiloxane and the resulting reaction product is washed to remove unreacted transition metal compound and polysiloxane, and dried to obtain a solid product (II).

The polysiloxane employed is a chain or cyclic siloxane polymer expressed by the general formula $\ce{-(Si(R_1,R_2)-O)_{\overline{n}}}$ (wherein n=3~1,000), and for example, as for chain polysiloxanes, dialkylpolysiloxanes such as dimethylpolysiloxane, methylethylpolysiloxane, etc., monoalkylmonoarylpolysiloxanes such as methylphenylpolysiloxane, etc., diarylpolysiloxanes such as diphenylpolysiloxane, etc., hydrogenated polysiloxanes such as hydrogenated methylpolysiloxane, hydrogenated phenylpolysiloxane, etc., and as for cyclic polysiloxanes, octamethylcyclotetrasiloxane, octaethylcyclotetrasiloxane, hexaphenylcyclotrisiloxane, etc. are mentioned.

The transition metal compound employed includes halides, oxyhalides, alcoholates, alkoxyhalides, acetoxyhalides, etc. of titanium or vanadium, and for example, titanium tetrachloride, titanium tetrabromide, tetraethoxytitanium, tetraisopropoxytitanium, tetrabutoxytitanium, monochlorotriisopropoxytitanium, dichlorodiisopropoxytitanium, trichloromonoisopropoxytitanium, dichlorodibutoxytitanium, vanadium tetrachloride, vanadium oxytrichloride, triisopropoxyvanadyl, tributoxyvanadyl, etc. are mentioned.

As for concrete methods for reacting a transition metal compound with the solid product (I) in the presence of a polysiloxane, the following various methods are mentioned: (1) The solid product (I), a polysiloxane and a transition metal compound are at the same time mixed and then heated. (2) The solid product (I) is mixed with a polysiloxane and then a transition metal compound is added, followed by heating. (3) A polysiloxane is mixed with a transition metal compound and then the solid product (I) is added, followed by heating. (4) The solid product (I) is mixed with a transition metal compound and then a polysiloxane is added, followed by heating.

As for the solvent employed at the time of the reaction or for washing or the like after the reaction in the preparation of the catalyst employed in the present invention, aliphatic hydrocarbons such as hexane, heptane, octane, nonane, decane, etc., aromatic hydrocarbons such as benzene, toluene, xylene, ethylbenzene, cumene, etc., halogenated aromatic hydrocarbons such as chlorobenzene, dichlorobenzene, trichlorobenzene, etc., halogenated hydrocarbons such as carbon tetrachloride, chloroform, dichloroethane, trichloroethylene, tetrachloroethylene, carbon tetrabromide, etc. and the like are mentioned.

As for the mixing proportions of the solid product (I), a polysiloxane and a transition metal compound, that of the polysiloxane is 10~10,000 g, preferably 20~1,000 g based on 100 g of the solid product (I), that of the transition metal compound is 1~1,000 g, preferably 10 g~500 g based on 100 g of the solid product (I), and that of the transition metal compound is 10~1,000 g, preferably 30~500 g based on 100 g of the polysiloxane.

Employment of a solvent for mixing and reaction of the above-mentioned components in the preparation of said solid product (II) is not always necessary, but desirable for carrying out uniform reaction. In this case, optional components or the total ones of the above-mentioned are, in advance, separately dissolved or dispersed in a solvent, and mixed. As for the total of the amounts of the solvent used, about 10 times or less the total of the amounts of the above-mentioned components may be sufficient.

As for the temperature at which they are mixed, a range of −50° C.~+40° C. is suitable, and most usually, mixing is carried out at room temperature. Mixing and subsequent reaction are preferably carried out with stirring. After mixing, reaction is carried out at 40°~300° C., preferably 50°~200° C., for 10 minutes~30 hours.

After the reaction, the reaction product is, in a conventional manner, filtered off, washed with a solvent such as aliphatic hydrocarbons, aromatic hydrocarbons, or the like to remove unreacted transition metal compound and polysiloxane, followed by drying, to obtain a solid product (II).

With this solid product (II) are then reacted at least two kinds of transition metal compounds consisting of at least one kind selected from the group (A) consisting of halogen-containing transition metal compounds of 4a group or 5a group of the Periodic Table and at least one kind selected from the group (B) consisting of halogen-free transition metal compounds of 4a group or 5a group of the Periodic Table.

Said halogen-containing transition metal compounds of group (A) includes halides, oxyhalides, alkoxyhalides, acetoxyhalides, and the like compounds of titanium or vanadium, for example, titanium tetrachloride, titanium tetrabromide, trichloromonoisopropoxytitanium, dichlorodiisopropoxytitanium, monochlorotriisopropoxytitanium, trichloromonobutyoxytitanium, dichlorodibutoxytitanium, monochlorotributoxytitanium, vanadium tetrachloride, vanadium oxytrichloride, etc. Said halogen-free transition metal compounds of group (B) include alkoxides of titanium or vanadium, for example, tetraalkyl orthotitanates (tetraalkoxytitaniums) such as tetramethyl orthotitanate (tetramethoxytitanium), tetraethyl orthotitanate (tetraethoxytitanium), tetraisopropyl orthotitanate (tetraisopropoxytitanium), tetra-n-butyl orthotitanate (tetra-n-butoxytitanium), etc., and vanadyl trialcoholates such as vanadyl triethylate (VO(OC$_2$H$_5$)$_3$), vanadyl triisopropylate (VO(OCH(CH$_3$)$_2$)$_3$), vanadyl tri-n-butylate (VO(OC$_4$H$_9$)$_3$), etc. As for the compounds of group (B), polytitanic acid esters can also be employed besides the above-mentioned compounds. These esters are expressed by the general formula RO$\pm$Ti(OR)$_2$O$\overline{]_m}$R wherein m represents an integer of 2 or more, preferably 2-10, and R represents an alkyl group, an aryl group or an aralkyl group, but it is unnecessary that all Rs are the same kinds of the groups, and the carbon atom number is preferably 1-10, although it is not particularly limited thereto. Concretely, methyl polytitanate, ethyl polytitanate, isopropyl polytitanate, n-propyl polytitanate, n-butyl polytitanate, n-hexyl polytitanate, etc. are mentioned. In said general formula, a part of the alkoxy group may be hydroxyl group. As for the compounds of group (B), the aforementioned ones are preferable to these polytitanic acid esters.

At least one kind is selected from among group (A) and at least one kind is selected from among group (B) as mentioned above; hence it is also included in the scope of the present invention to select two kinds or more of transition metal compounds from among the same group and employ these together with those selected from among the other group.

As for the concrete method for reacting the solid product (II) with the respective transition metal compounds selected from among group (A) and group (B) (these may be hereinafter referred to as (A) group transition metal compounds and (B) group transition metal compounds, respectively, and when two or more kinds of transition metal compounds are selected from among the one group, the total thereof are included), the following various methods can be mentioned:

(1) The solid product (II) is added to a mixture of (A) group transition metal compound(s) with (B) group transition metal compound(s), followed by heating.
(2) (A) group transition metal compound(s) are mixed with the solid product (II) and then (B) group transition metal compound(s) are added, followed by heating.
(3) (A) group transition metal compound(s) are reacted on heating with the solid product (II), and successively (B) group transition metal compound(s) are added, followed by heating.

Any of these methods can be carried out either in the presence or absence of solvent. The solvents employed are the same as those afore-mentioned as solvents employed at the time of the reaction or for washing, etc. after the reaction in the catalyst separation of the present invention.

The ratio of the amount of (A) group transition metal compound(s) employed, to that of (B) group transition metal compound(s) employed (if two kinds or more are selected from among one group, the total amount thereof is referred to) is 10/1~1/10 preferably 5/1~1/5, in terms of the ratio of the atom number of transition metal contained in (A) group transition metal compound(s) to that contained in (B) group transition metal compound(s) (which will be referred to merely as atom ratio of transition metals). As for the proportion of the total amount of the transition metal compounds to the weight of the solid product (II), 1-1,000 g based on 100 g of the solid product (II) may be sufficient.

The reaction temperature is in the range of 30°-500° C., preferably 50°-300° C., the reaction time is in the range of 10 minutes-50 hours, preferably 30 minutes-10 hours. In case where a solvent is employed, 0-1,000 ml based on 100 g of the solid product (II) may be sufficient. Thus a transition metal compound is supported on the solid product (II).

After completion of the reaction, the resulting material is, in a conventional manner, filtered off, and washed with a solvent such as aliphatic hydrocarbons, aromatic hydrocarbons, etc. at room temperature or preferably 60° C. or higher to remove unreacted transition metal compounds, followed by drying to obtain a solid product (III).

This solid product (III) is combined with an organoaluminum compound to obtain a polymerization catalyst.

As for the organoaluminum compound, trialkylaluminums such as triethylaluminum, triisobutylaluminum, trihexylaluminum, etc., dialkylaluminum monochlorides such as diethylaluminum monochloride, etc., ethylaluminum sesquichloride, etc., and besides, alkoxyalkylaluminums such as monoethoxydiethylaluminum, diethoxymonoethylaluminum, etc. are mentioned.

Catalyst thus obtained is used for producing α-olefin polymers. As for α-olefin, straight chain monoolefins such as ethylene, propylene, butene-1, hexene-1, octene-1, decene-1, etc., brached chain monoolefins such as 4-methylpentene-1, etc., diolefins such as butadiene, etc. are mentioned. The present invention includes not only homopolymerization of these olefins but also copolymerization of two kinds or more polymerizable α-olefins among the above-mentioned olefins.

The polymerization reaction is carried out usually in a hydrocarbon solvent such as hexane, heptane, octane, etc. It is carried out at a polymerization temperature of 30°-150° C., preferably 60°-120° C. and under a polymerization pressure of the atmospheric pressure to 50

Kg/cm², preferably 5–40 Kg/cm². At the time of polymerization, it is possible to add a proper amount of hydrogen to the polymerization system for adjusting the molecular weight.

A first effectiveness of the present invention is in that olefin polymers having a very broad molecular weight distribution are obtained. Particularly in the case of ethylene polymers, the distribution is 20–32 in terms of $\overline{M}w/\overline{M}n$, and at the time of molding of polymers, their flow characteristics are superior, and resin pressure is low and no melt fracture occurs, thus the appearance of the resulting moldings are superior and moldability is stabilized. Further, propylene polymers are characteristic of a high stereoregularity.

A second effectiveness of the present invention is in that the polymerization activity is very high. In the case of ethylene polymers, the polymer yield amounts to 1,100 in terms of g (polymer)/{solid product (III) g×polymerization time (Hr)×olefin pressure (Kg/cm²)} which will often be hereinafter abbreviated to Ep. Thus, it is possible to do without step of removal of catalyst remaining in polymer after completion of the reaction, i.e. step of ash-removal.

A third effectiveness of the present invention is in that the resulting polymer particle has a very good shape. Whether the shape of the polymer particle is good or not can be judged by measuring the bulk density (which will be hereinafter abbreviated to BD) of polymer particle. The superior shape of polymer particle results in a high production efficiency per unit volume of polymerization vessel per hour, no trouble at the time of transportation of polymer through piping lines and easy granulation of polymer powder. The BD of polymers obtained according to the present invention is in the range of 0.35–0.43 in the case of ethylene polymers and 0.40–0.50 in the case of propylene polymers, and according to observation through a microscope, the particle is spherical or close to sphere, and also has a smooth surface.

Another effectiveness of the present invention is in that no or very few adhesion of polymer onto the wall surface of polymerization vessel occurs at the time of polymerization, which makes it possible to carry out a continuous polymerization in a stabilized manner for a long time, in a same polymerization vessel. Further it has become possible to provide a new polymerization method applicable to either ethylene polymerization or polymerization of α-olefins other than ethylene.

The present invention will be mentioned by way of Examples.

In the following Examples and Comparative examples, melt index (which will be hereinafter abbreviated to MI) was according to ASTM D-1238(E) and melt flow rate (which will be hereinafter abbreviated to MFR) was according to ASTM D-1238(L). $\overline{M}w/\overline{M}n$ (wherein $\overline{M}w$ represents weight average molecular weight and $\overline{M}n$ represents number average molecular weight) was sought through gel permeation chromatography (by means of GPC-200 Type made by Waters Company).

EXAMPLE 1

(1) Preparation of solid product (III)

58 Grams of magnesium hydroxide and 90 g of aluminum trichloride (anhydrous) were, in advance, mixed and milled in a vibrating mill for 5 hours and then reacted together at 150° C. for 5 hours, followed by cooling and fine milling to obtain a solid product (I).

173 Grams of titanium tetrachloride and 100 g of a chain dimethylpolysiloxane (Toshiba Silicone Oil TSF 450-100 made by Toshiba Electric Co.; viscosity, 100 centistokes) were added to and mixed with 100 ml of toluene, and 100 g of the above-mentioned solid product (I) was then added, followed by reaction with stirring at 110° C. for 2 hours. After completion of the reaction, filtration was first carried out and the remaining solid product was washed with hexane until unreacted titanium tetrachloride and unreacted polysiloxane were not detected in the filtrate, followed by drying in vacuo to obtain a solid product (II).

Next, 87 g of titanium tetrachloride and 65 g of tetraisopropyl orthotitanate in an atomic ratio of transition metals (in terms of the above-mentioned definition) of 2/1 were added to and mixed with 400 ml of toluene and then 100 g of the above-mentioned solid product (II) was added, followed by reaction with stirring at 110° C. for 3 hours. After completion of the reaction, filtration was, in a conventional manner, carried out and washing with hexane was repeated until no titanium compound was detected in the filtrate, followed by drying in vacuo to obtain a solid product (III), which contained 102 mg of titanium atom in 1 g thereof.

All procedure from the start to the preparation of the solid product (III) was carried out in nitrogen gas containing no water. This applies to the following Examples and Comparative examples.

(2) Polymerization of ethylene

Into a 10 l stainless steel polymerization vessel purged with nitrogen gas were introduced 7 l of hexane, 397 mg (2 mmol) of triisobutylaluminum and 50 mg of the solid product (III). The polymerization vessel was closed and heated to 85° C., and hydrogen was introduced so as to give a pressure up to 16 Kg/cm² (gauge). Reaction was carried out at 85° C. for one hour while adding ethylene so as to maintain a total pressure of 35 Kg/cm² (gauge). After completion of the reaction, the resulting slurry of ethylene polymer was filtered off without removing ash and dried to give 900 g of a white polymer, which had a MI of 0.25, a BD of 0.40, and a $\overline{M}w/\overline{M}n$ of 32 and whose Ep (polymer yield) was 1,000.

COMPARATIVE EXAMPLE 1

An ethylene polymer was prepared in the same manner as in Example 1 except that the solid product (II) was substituted for the solid product (III) as a final solid product (as in this case, a solid catalyst component to be combined with an organoaluminum compound and employed for catalyst will be hereinafter referred to as "final solid product" in the following Comparative examples).

COMPARATIVE EXAMPLE 2

Preparation of a final solid product and production of an ethylene polymer were carried out in the same manner as in Example 1 except that the solid product (I) was substituted for the solid product (II).

COMPARATIVE EXAMPLE 3

Preparation of a final solid product and production of an ethylene polymer were carried out in the same manner as in Example 1 except that when the solid product (II) was prepared in Example 1, no polysiloxane was employed.

COMPARATIVE EXAMPLE 4

Preparation of a final solid product and production of an ethylene polymer were carried out in the same manner as in Example 1 except that when the solid product (II) was prepared in Example 1, no titanium tetrachloride was employed.

COMPARATIVE EXAMPLE 5

Preparation of a final solid product and production of an ethylene polymer were carried out in the same manner as in Example 1 except that no tetraisopropyl orthotitanate was employed in Example 1.

COMPARATIVE EXAMPLE 6

Preparation of a final solid product and production of an ethylene polymer were carried out in the same manner as in Example 1 except that when the solid product (III) was prepared from the solid product (II) in Example 1, no titanium tetrachloride was employed.

COMPARATIVE EXAMPLE 7

87 grams of titanium tetrachloride and 65 g of tetraisopropyl orthotitanate were mixed together in 100 ml of toluene and reacted at 110° C. for 3 hours, followed by cooling, adding 500 ml of hexane, precipitating a solid product, filtration and drying to obtain a solid product. An ethylene polymer was then produced in the same manner as in Example 1 except that this solid product was employed as a final solid product. The yield of the resulting polymer was much reduced and the shape of the polymer was inferior, and also the amount of polymer which adhered onto the wall of the polymerization vessel was very large.

COMPARATIVE EXAMPLE 8

Preparation of a final solid product and production of an ethylene polymer were carried out in the same manner as in Example 1 except that 65 g of tetraisopropyl orthotitanate was replaced by 44 g (equimolecular thereto) of vanadium tetrachloride.

COMPARATIVE EXAMPLE 9

Preparation of a final solid product and production of an ethylene polymer were carried out in the same manner as in Example 1 except that 87 g of titanium tetrachloride to be reacted with the solid product (II) was replaced by 156 g (equimolecular thereto) of tetra-n-butyl orthotitanate.

EXAMPLE 2

One hundred grams of the solid product (I) obtained in Example 1, 173 g of titanium tetrachloride and 100 g of chain dimethylpolysiloxane (viscosity: 50 centistokes) were mixed in 100 ml of toluene at the same time at room temperature, and reacted with stirring at 110° C. for 2 hours. Subsequent procedure was carried out in the same manner as in Example 1 to obtain a solid product (II).

Next, 100 g of this solid product (II) and 87 g of titanium tetrachloride were introduced into 400 ml of toluene, and reacted with stirring at 110° C. for one hour. Thereafter 65 g of tetraisopropyl orthotitanate (atomic ratio of transition metals, 2/1) was added, followed by further reaction at 110° C. for 2 hours. Subsequent procedure was carried out in the same manner as in Example 1 to obtain a solid product (III).

Employing this solid product (III), production of an ethylene polymer was carried out in the same manner as in Example 1.

EXAMPLE 3

75 Grams of magnesium oxide and 80 g of aluminum trichloride (anhydrous) were mixed and milled in a ball mill for 24 hours, and then reacted at 50° C. for 50 hours to obtain a solid product (I).

One hundred grams of the solid product (I) and 100 g of chain dimethylpolysiloxane (viscosity, 1,000 centistokes) were introduced into 150 ml of hexane and mixed together and then 130 g of titanium tetrachloride was added, followed by reaction at 60° C. for 9 hours to obtain a solid product (II).

Next, 100 g of this solid product (II) and 29 g of tetramethyl orthotitanate were introduced in 500 ml of xylene, and then 95 g of titanium tetrachloride (atomic ratio of transition metals, 3/1) was added, followed by reaction at 140° C. for 3 hours to obtain a solid product (III).

Employing this solid product (III), production of an ethylene polymer was carried out in the same manner as in Example 1.

EXAMPLE 4

Forty grams of aluminum-magnesium oxide (MgAl$_2$O$_4$) and 85 g of ferric chloride (anhydrous) were mixed and milled in a vibrating mill for 7 hours, and then reacted at 100° C. for 10 hours to obtain a solid product (I).

One hundred grams of this solid product (I) and 100 g of titanium tetrachloride were introduced into 100 ml of benzene and mixed together at room temperature, and immediately thereafter 100 g of chain methylethylpolysiloxane (viscosity, 100 centistokes) was added, followed by reaction at 78° C. for 7 hours to obtain a solid product (II).

Next, 100 g of this solid product (II) and 114 g of titanium tetrachloride were introduced into 200 ml of benzene, and reacted at 78° C. for 5 hours. Thereafter 58 g of tetrabutyl orthotitanate (atomic ratio of transition metals, 3.5/1) was added, followed by reaction at 78° C. for 5 hours to obtain a solid product (III).

Employing this solid product (III), production of an ethylene polymer was carried out in the same manner as in Example 1.

EXAMPLE 5

Eighty grams of magnesium carbonate and 80 g of aluminum chloride (anhydrous) were mixed and milled in a ball mill for 10 hours, followed by reaction at 200° C. for 1.5 hours to obtain a solid product (I).

Five hundred grams of octamethylcyclotetrasiloxane (viscosity, 2 centistokes) and 190 g of titanium tetrachloride were mixed, and 100 g of the above-mentioned solid product (I) was added, followed by reaction at 200° C. for 30 minutes to obtain a solid product (II).

Next, 127 g of titanium tetrachloride and 81 g of vanadyl triisopropylate [VO(OCH(CH$_3$)$_2$)$_3$] (atomic ratio of transition metals, 2/1) were mixed, and 100 g of the above-mentioned solid product (II) was added, followed by reaction at 110° C. for 4 hours to obtain a solid product (III).

Employing this solid product (III), production of an ethylene polymer was carried out in the same manner as in Example 1.

EXAMPLE 6

65 Grams of magnesium chloride ($MgCl_2 \cdot 6H_2O$) and 80 g of aluminum chloride (anhydrous) were mixed and milled in a vibrating mill for 2 hours, and reacted at 150° C. for 5 hours to obtain a solid product (I).

One hundred grams of this solid product (I), 100 g of chain methylphenylpolysiloxane (200 centistokes) and 150 g of titanium tetrachloride were mixed in 100 ml of toluene at the same time at room temperature, followed by reaction at 100° C. for 6 hours to obtain a solid product (II).

Next, 89 g of vanadium tetrachloride and 65 g of tetraisopropyl orthotitanate (atomic ratio of transition metals, 2/1) in 300 ml of trichlorobenzene were mixed and 100 g of the above-mentioned solid product (II) was added, followed by reaction at 200° C. for one hour to obtain a solid product (III).

Employing this solid product (III), production of an ethylene polymer was carried out in the same manner as in Example 1.

EXAMPLE 7

110 Grams of magnesia cement ($MgCl_2 \cdot 3MgO \cdot 4H_2O$) and 95 g of aluminum trichloride (anhydrous) were mixed and milled in a vibrating mill for 3 hours, followed by reaction at 130° C. for 4 hours to obtain a solid product (I).

One hundred grams of this solid product (I) and 50 g of titanium tetrachloride were mixed in 300 ml of toluene at room temperature, and 100 g of chain hydrogenated methylpolysiloxane (viscosity, 100 centistokes) was added, followed by reaction at 110° C. for one hour to obtain a solid product (II).

Employing this solid product (II), preparation of a solid product (III) and production of an ethylene polymer were carried out in the same manner as in Example 2.

EXAMPLE 8

Eighty grams of hydromagnesite ($3MgCO_3 \cdot Mg(OH)_2 \cdot 3H_2O$) and 120 g of aluminum chloride (anhydrous) were mixed and milled in a vibrating mill for 10 hours, followed by reaction at 300° C. for 30 minutes to obtain a solid product (I).

One hundred grams of this solid product (I), 100 g of chain dimethylpolysiloxane (100 centistokes) and 190 g of titanium tetrachloride, were mixed together in 200 ml of xylene at the same time at room temperature, followed by reaction at 130° C. for one hour to obtain a solid product (II).

Next, 100 g of this solid product (II), 95 g of titanium tetrachloride and 57 g of tetraethyl orthotitanate (atomic ratio of transition metals, 2/1) were mixed together in 400 ml of xylene at the same time at room temperature, followed by reaction at 130° C. for 3 hours to obtain a solid product (III).

Employing this solid product (III), production of an ethylene polymer was carried out in the same manner as in Example 1.

EXAMPLE 9

One hundred grams of the solid product (II) obtained in Example 1 was mixed with 32 g of isopropyl orthotitanate, 39 g of tetra-n-butyl orthotitanate and 87 g of titanium tetrachloride (atomic ratio of transition metals, 2/1) in 400 ml of toluene. Subsequent procedure was carried out in the same manner as in Example 1 to carry out preparation of a solid product (III) and production of an ethylene polymer.

EXAMPLE 10

Preparation of a solid product (III) and production of an ethylene polymer were carried out in the same manner as in Example 1 except that 100 g of the solid product (II) obtained in Example 1 was reacted with 53.4 g of trichloromonoisopropoxytitanium and 101 g of vanadyl triethylate (atomic ratio of transition metals, 1/2).

EXAMPLE 11

Preparation of a solid product (III) and production of an ethylene polymer were carried out in the same manner as in Example 1 except that 100 g of the solid product (II) obtained in Example 1 was reacted with 53 g of dichlorodibutoxytitanium and 172 g of vanadyl tri-n-butyrate (atomic ratio of transition metals, 1/3).

EXAMPLE 12

An ethylene-propylene copolymer was produced in the same manner as in Example 1 except that employing the solid product (III) obtained in Example 1, hydrogen was introduced so as to give a pressure up to 9 $Kg/cm^2$ (gauge) and ethylene containing 8% by volume of propylene was added so as to maintain a total pressure of 35 $Kg/cm^2$ (gauge).

EXAMPLE 13

An ethylene-butene copolymer was produced in the same manner as in Example 1 except that employing the solid product (III) obtained in Example 1, hydrogen was introduced so as to give a pressure up to 10 $Kg/cm^2$, and ethylene containing 10% by volume of butene-1 was added so as to maintain a total pressure of 35 $Kg/cm^2$ (gauge).

Results of Examples 1–13 and Comparative examples 1–9 are summarized in Table 1.

TABLE 1

| Examples or Comparative examples | Transition metal atom contained in 1 g of solid product (III) or final solid product (mg) | Polymer yield (g) Ep | per g of transition metal atom | Physical properties of polymer MI | BD | Mw/Mn | Comonomer content (% by weight) |
|---|---|---|---|---|---|---|---|
| Example 1 | 102 | 1,000 | $1.8 \times 10^5$ | 0.25 | 0.40 | 32 | |
| Comparative ex. 1 | 8 | 1,150 | $2.6 \times 10^6$ | 15 | 0.44 | 5 | |
| Comparative ex. 2 | 43 | 270 | $1.1 \times 10^5$ | 0.14 | 0.29 | 24 | |
| Comparative ex. 3 | 50 | 280 | $1.0 \times 10^5$ | 0.16 | 0.28 | 24 | |
| Comparative ex. 4 | 40 | 260 | $1.2 \times 10^5$ | 0.18 | 0.30 | 22 | |
| Comparative | | | | | | | |

TABLE 1-continued

| Examples or Comparative examples | Transition metal atom contained in 1 g of solid product (III) or final solid product (mg) | Polymer yield (g) per g of transition metal atom | Ep | Physical properties of polymer MI | BD | Mw/Mn | Comonomer content (% by weight) |
|---|---|---|---|---|---|---|---|
| ex. 5 | 10 | 1,100 | $2.0 \times 10^6$ | 16 | 0.40 | 4 | |
| Comparative ex. 6 | 9 | 550 | $1.1 \times 10^6$ | 12 | 0.38 | 6 | |
| Comparative ex. 7 | 220 | 150 | $0.1 \times 10^5$ | 0.01 | 0.20 | 15 | |
| Comparative ex. 8 | 35 | 1,080 | $5.6 \times 10^5$ | 0.97 | 0.35 | 13 | |
| Comparative ex. 9 | 15 | 400 | $4.8 \times 10^5$ | 0.15 | 0.27 | 10 | |
| Example 2 | 99 | 1,000 | $1.8 \times 10^5$ | 0.26 | 0.40 | 32 | |
| Example 3 | 90 | 950 | $1.9 \times 10^5$ | 0.20 | 0.38 | 28 | |
| Example 4 | 70 | 750 | $1.9 \times 10^5$ | 0.10 | 0.36 | 23 | |
| Example 5 | 75 | 820 | $2.0 \times 10^5$ | 0.17 | 0.37 | 25 | |
| Example 6 | 80 | 870 | $2.0 \times 10^5$ | 0.19 | 0.35 | 25 | |
| Example 7 | 95 | 960 | $1.8 \times 10^5$ | 0.24 | 0.38 | 30 | |
| Example 8 | 92 | 900 | $1.8 \times 10^5$ | 0.15 | 0.38 | 27 | |
| Example 9 | 85 | 850 | $1.8 \times 10^5$ | 0.15 | 0.38 | 27 | |
| Example 10 | 75 | 740 | $1.8 \times 10^5$ | 0.14 | 0.37 | 26 | |
| Example 11 | 70 | 650 | $1.7 \times 10^5$ | 0.10 | 0.36 | 21 | |
| Example 12 | (Example 1) | 1,100 | $1.9 \times 10^5$ | 0.40 | 0.37 | 28 | 6.7 |
| Example 13 | (Example 1) | 1.050 | $1.9 \times 10^5$ | 0.32 | 0.36 | 29 | 5.4 |

EXAMPLE 14

Employing the solid product (III) obtained in Example 1, propylene polymerization was carried out. Into a 5 l capacity stainless steel polymerization vessel, were introduced 3.5 l of hexane, 210 mg of diethylaluminum chloride and 50 mg of the solid product (III), and reaction was carried out under a hydrogen partial pressure of 1 Kg/cm$^2$ (gauge) and a propylene partial pressure of 10 Kg/cm$^2$ (gauge) at 70° C. for 4 hours. The resulting polymer had a MFR of 4.2, a BD of 0.47, a $\overline{M}w/\overline{M}n$ of 9 and an isotactic index of 0.92 (isotactic index: a ratio of the weight of an extraction residue left after extraction of a polymer with boiling n-heptane (98° C.) for 4 hours, to the weight of the polymer before the extraction), and the polymer yield was 5,900 g per g of the solid product (III).

EXAMPLE 15

Production of a butene polymer was carried out in the same manner as in Example 12 except that 500 g of butene-1 was substituted for propylene. The resulting polymer yield was 900 g per g of the solid product (III).

In every case of the above-mentioned Examples 1–15, no adhesion of polymer onto the wall of the polymerization vessel was observed.

EXAMPLE 16

(1) Preparation of solid product (III)

173 Grams of titanium tetrachloride and 100 g of chain dimethylpolysiloxane (Toray Silicone SH-200, viscosity: 100 centistokes) were added to 100 ml of toluene and mixed together. Thereafter 100 g of the solid product (I) obtained in the same manner as in Example 1 was added, and reaction was carried out with stirring at 110° C. for 2 hours. After completion of the reaction, filtration was carried out in a conventional manner, and the resulting remaining solid product was washed with hexane until unreacted titanium tetrachloride and unreacted polysiloxane were not detected, followed by drying in vacuo to obtain a solid product (II).

Next, 87 g of titanium tetrachloride and 46.4 g of polyisopropyl titanate (pentamer) (atomic ratio of transition metals, 2/1) were added to 400 ml of toluene and mixed together, and then 100 g of the solid product (II) was added, followed by reaction with stirring at 110° C. for 3 hours. After completion of the reaction, the temperature was lowered down to 80° C., followed by filtration. The resulting remaining solid product was repeatedly washed with toluene heated to 80° C. until no titanium compound was detected in the filtrate, followed by drying in vacuo to obtain 150 g of a solid product (III), which had 95 mg of titanium atom in 1 g of the product.

(2) Polymerization of ethylene

Ethylene polymerization was carried out in the same manner except that the above-mentioned solid product (III) was substituted for that of Example 1.

After completion of the reaction, methanol was added to terminate the polymerization. The resulting ethylene polymer slurry was filtered off without subjecting it to ash removal, and dried to obtain 810 g of a white polymer, which had a MI of 0.23, a BD of 0.39 and a $\overline{M}w/\overline{M}n$ of 30. The polymer yield (Ep) was 900.

COMPARATIVE EXAMPLE 10

An ethylene polymer was produced in the same manner as in Example 16 except that the solid product (II) obtained in Example 16 was employed as a final solid product in place of the solid product (III).

COMPARATIVE EXAMPLE 11

Preparation of a final solid product and production of an ethylene polymer were carried out in the same manner as in Example 16 except that the solid product (I) was substituted for the solid product (II) in Example 16.

COMPARATIVE EXAMPLE 12

Preparation of a final solid product and production of an ethylene polymer were carried out in the same manner as in Example 16 except that no polysiloxane was employed in the preparation of the solid product (II) in Example 16.

COMPARATIVE EXAMPLE 13

Preparation of a final solid product and production of an ethylene polymer were carried out in the same manner as in Example 16 except that no titanium tetrachloride was employed in the preparation of the solid product (II) in Example 16.

COMPARATIVE EXAMPLE 14

Preparation of a final solid product and production of an ethylene polymer were carried out in the same manner as in Example 16 except that no polyisopropyl titanate was employed in Example 16.

COMPARATIVE EXAMPLE 15

Preparation of a final solid product and production of an ethylene polymer were carried out in the same manner as in Example 16 except that no titanium tetrachloride was employed in the preparation of the solid product (III) from the solid product (II) in Example 16.

COMPARATIVE EXAMPLE 16

Preparation of a final solid product and production of an ethylene polymer were carried out in the same manner as in Example 16 except that polyisopropyl titanate in Example 16 was replaced by vanadium oxytrichloride in an amount of 40 g which gave the same atomic ratio of transition metals as in titanium tetrachloride in Example 16.

COMPARATIVE EXAMPLE 17

Preparation of a final solid product and production of an ethylene polymer were carried out in the same manner as in Example 16 except that titanium tetrachloride reacted with the solid product (II) in Example 16 was replaced by poly-n-butyl titanate (dimer) in an amount of 126 g which gave the same ratio of transition metals as in titanium tetrachloride in Example 16.

COMPARATIVE EXAMPLE 18

87 Grams of titanium tetrachloride and 46.4 g of polyisopropyl titanate (pentamer) (atomic ratio of transition metals, 2/1) were mixed in 100 ml of toluene, and reaction was carried out at 110° C. for 2 hours. Thereafter the temperature was lowered down to room temperature, and 400 ml of hexane was added. After allowing the resulting solution to stand, a solid product precipitated, which was then filtered off, washed with hexane and dried to obtain a solid product. Employing this product as a final solid product, an ethylene polymer was produced in the same manner as in Example 16.

COMPARATIVE EXAMPLE 19

Production of an ethylene polymer was produced in the same manner as in Example 16 except that 25 mg of the solid product (II) obtained in Example 16 and 75 mg of the solid product obtained in Comparative example 18 were combined together and employed as a final solid product.

COMPARATIVE EXAMPLE 20

Preparation of a final solid product and production of an ethylene polymer were carried out in the same manner as in Example 16 except that 78 g of silicon tetrachloride ($SiCl_4$) was substituted for titanium tetrachloride to be reacted with the solid product (II).

COMPARATIVE EXAMPLE 21

Preparation of a final solid product and production of an ethylene polymer were carried out in the same manner as in Comparative example 20 except that 61 g of aluminum trichloride (anhydrous) was substituted for silicon tetrachloride in Comparative example 20.

EXAMPLE 17

In Example 16, the reaction of the solid product (II), titanium tetrachloride and polyisopropyl titanate was carried out in 100 ml of toluene. Thereafter the temperature of the reaction solution was lowered down to room temperature, and 400 ml of hexane was added. After allowing the resulting solution to stand, the resulting solid product was filtered off, washed with hexane and dried to obtain 180 g of a solid product (III). Employing this solid product (III), an ethylene polymer was produced in the same manner as in Example 16.

EXAMPLE 18

75 Grams of magnesium oxide and 80 g of aluminum chloride (anhydrous) were mixed and milled in a ball mill for 24 hours, followed by reaction at 100° C. for 10 hours to obtain a solid product (I).

100 Grams of this solid product (I) and 100 g of chain methylphenylpolysiloxane (viscosity, 500 centistokes) were introduced into 100 ml of benzene and mixed together, and then 150 g of titanium tetrachloride was added, followed by reaction at 80° C. for 7 hours to obtain a solid product (II).

Next, 100 g of this solid product (II) and 69 g of poly-n-butyl titanate (dimer) were introduced into 400 ml of xylene, and 96 g of vanadium tetrachloride (atomic ratio of transition metals, 3/1) was added, followed by reaction at 130° C. for 3 hours. Subsequently, preparation of a solid product (III) and production of an ethylene polymer were carried out in the same manner as in Example 16.

EXAMPLE 19

65 Grams of hydromagnesite ($3MgCO_3.Mg(OH)_2.3-H_2O$) and 70 g of ferric chloride (anhydrous) were mixed and milled in a vibrating mill for 10 hours, followed by reaction at 300° C. for one hour to obtain a solid product (I).

100 Grams of this solid product (I), 50 g of titanium tetrachloride and 100 g of chain hydrogenated methylpolysiloxane (viscosity, 50 centistokes) were added to 200 ml of xylene, followed by reaction at 130° C. for one hour to obtain a solid product (II).

Next, 100 g of this solid product (II) and 86 g of vanadium oxytrichloride were introduced into 300 ml of toluene and mixed together, and then 41 g of polyethyl titanate (hexamer) (atomic ratio of transition metals, 2/1), was added, followed by reaction at 120° C. for 4 hours. Subsequently, preparation of a solid product (III) and production of an ethylene polymer were carried out in the same manner as in Example 16.

EXAMPLE 20

An ethylene-propylene copolymer was produced in the same manner as in Example 16 except that employing the solid product (III) obtained in Example 16, hydrogen was introduced so as to give a pressure up to 9 Kg/cm² (gauge) and ethylene containing 8% by volume of propylene was added so as to maintain the total pressure at 35 Kg/cm² (gauge). The propylene content in the resulting copolymer was 6.1%.

EXAMPLE 21

An ethylene-butene-1 copolymer was produced in the same manner as in Example 16 except that employing the solid product (III) obtained in Example 16, hydrogen was introduced so as to give a pressure up to 10 Kg/cm² (gauge) and ethylene containing 10% by volume of butene-1 was added so as to maintain the total pressure at 35 Kg/cm² (gauge). The butene-1 content in the copolymer was 5.2%.

The results of the above-mentioned Examples 16-21 and Comparative examples 10-21 are summarily shown in Table 2.

TABLE 2

| Examples or Comparative examples | Transition metal atom contained in 1 g of Solid product (III) or final solid product (mg) | Polymer yield (g) | | Physical properties of polymer | | |
|---|---|---|---|---|---|---|
| | | Ep | per g of transition metal atom | MI | BD | Mw/Mn |
| Example 16 | 95 | 900 | $1.7 \times 10^5$ | 0.23 | 0.39 | 30 |
| Comparative ex. 10 | 8 | 1,150 | $2.6 \times 10^6$ | 15 | 0.44 | 5 |
| Comparative ex. 11 | 45 | 275 | $1.1 \times 10^5$ | 0.15 | 0.28 | 23 |
| Comparative ex. 12 | 55 | 285 | $0.9 \times 10^5$ | 0.14 | 0.28 | 23 |
| Comparative ex. 13 | 41 | 255 | $1.1 \times 10^5$ | 0.16 | 0.30 | 21 |
| Comparative ex. 14 | 10 | 1,100 | $2.0 \times 10^6$ | 16 | 0.40 | 4 |
| Comparative ex. 15 | 9 | 500 | $1.0 \times 10^6$ | 11 | 0.36 | 6 |
| Comparative ex. 16 | 20 | 1,000 | $9.0 \times 10^5$ | 0.85 | 0.36 | 13 |
| Comparative ex. 17 | 16 | 350 | $3.9 \times 10^5$ | 0.17 | 0.27 | 10 |
| Comparative ex. 18 | 225 | 120 | $1.0 \times 10^4$ | 0.01 | 0.19 | 13 |
| Comparative ex. 19 | — | 800 | — | 0.85 | 0.26 | 9 |
| Comparative ex. 20 | 15 | 250 | $3.0 \times 10^5$ | 0.05 | 0.28 | 17 |
| Comparative ex. 21 | 11 | 150 | $2.5 \times 10^5$ | 0.04 | 0.28 | 15 |
| Example 17 | 115 | 600 | $0.9 \times 10^5$ | 0.10 | 0.34 | 24 |
| Example 18 | 90 | 950 | $1.9 \times 10^5$ | 0.20 | 0.38 | 28 |
| Example 19 | 105 | 980 | $1.7 \times 10^5$ | 0.30 | 0.40 | 27 |
| Example 20 | (Example 16) | 1,000 | $2.6 \times 10^5$ | 0.35 | 0.37 | 27 |
| Example 21 | (Example 16) | 950 | $2.4 \times 10^5$ | 0.30 | 0.36 | 28 |

EXAMPLE 22

Propylene polymerization was carried out employing the solid product (III) obtained in Example 16. Into a 5 l capacity polymerization vessel were introduced 3.5 l of hexane, 228 mg of triethylaluminum and 50 mg of the solid product (III), and reaction was carried out under a hydrogen partial pressure of 1 Kg/cm² (gauge) and a propylene partial pressure of 10 Kg/cm² (gauge) at 70° C. for 4 hours. The resulting polymer had a MFR of 4.5, a BD of 0.45 and an isotactic index of 0.91. The polymer yield was 5,800 g per g of the solid product (III). The $\overline{Mw}/\overline{Mn}$ of the polymer was 9.2.

According to Comparative examples 1 and 10, it can be seen that if the solid product (II) is employed as it is, the value of Mw/Mn is small, but when the solid product (II) is converted into the solid product (III) and this solid product (III) is employed, the molecular weight distribution is broadened with a leap.

According to Comparative examples 2-4 and 11-13, it can be seen that if the solid product to be reacted with the group (A) and the group (B) in the present invention is not a specified product (the solid product (II)), the polymer yield is much inferior.

According to Comparative examples 5, 6, 8, 9 and 14-17, it can be seen that the group (A) and the group (B) are both required as the transition metal compounds to be reacted with the solid product (II).

According to Comparative examples 7, 18 and 19, it can be seen that the respective transition metal compounds group (A) and group (B) in the present invention exhibit their effectiveness due to the reaction thereof with the solid product (II), and the presence of the mixture of a reaction product of the transition metal compound group (A) with the transition metal compound group (B) does not bring about the effectiveness of the present invention.

According to Comparative examples 20 and 21, it can be seen that even if the compound to be reacted with the solid product (II) together with the transition metal compound group (B) is a halogen-containing compound, the effectiveness of the present invention is not exhibited unless the first-mentioned compound contains a transition metal at the same time.

What is claimed is:

1. In a method for producing α-olefin polymers by homopolymerization or copolymerization of α-olefins in the presence of a catalyst obtained by combining a solid product (III) with an organoaluminum compound, the improvement which comprises employing as said solid product (III) a material obtained by
    (a) obtaining a solid product (I) by reacting
        (1) a trivalent metal halide selected from the group consisting of anhydrous aluminum chloride and anhydrous ferric chloride, with
        (2) a divalent metal hydroxide, oxide, carbonate or a composite compound containing a divalent metal hydroxide, oxide or carbonate or a hydrate of a divalent metal compound,
(b) obtaining a solid product (II) by reacting
  (1) said solid product (I) with
  (2) a transition metal compound selected from the group consisting of halides, oxyhalides, alcoholates, alkoxyhalides and acetoxyhalides of a transition metal selected from the group consisting of titanium and vanadium
    said reaction being carried out in the presence of a polysiloxane,
    said reaction being carried out by mixing said solid product (I), said transition metal compound and said polysiloxane and then heating the mixture at 50° C. to 300° C.,
(c) reacting said solid product (II) with at least two kinds of transition metal compounds consisting of
  (1) at least one halogen-containing transition metal compound selected from the group consisting of the halides, oxyhalides, alkoxyhalides and acetoxyhalides of titanium or vanadium and
  (2) at least one halogen-free transition metal compound selected from the group consisting of tetraalkyl orthotitanates, vanadyl trialcoholates and polytitanic acid esters expressed by the general formula

RO₊[Ti(OR)₂O]ₘR wherein m is an integer of 2 or more and the Rs are the same or different kinds of alkyl groups, aryl groups or aralkyl groups.

2. The improvement according to claim 1 wherein m in said general formula of the polytitanic acid ester is 2-10 and Rs therein have 1-10 carbon atoms.

3. The improvement according to claim 1 wherein step (b) is carried out by employing 10-10,000 g of a polysiloxane based on 100 g of said solid product (I), and 10-1,000 g of said transition metal compound based on 100 g of said polysiloxane.

4. The improvement according to claim 1 wherein step (c) is carried out by adding said solid product (II) to a mixture of at least one said halogen-containing transition metal compound and at least one said halogen-free transition metal compound and heating them together.

5. The improvement according to claim 1 wherein said step (c) is carried out by mixing at least one said halogen-containing transition metal compound with said solid product (II), adding to the resulting mixture at least one said halogen-free transition metal compound and heating them together.

6. The improvement according to claim 1 wherein said step (c) is carried out by reacting at least one said halogen-containing transition metal compound with said solid product (II) with heating, and then adding to the resulting reaction product at least one said halogen-free transition metal compound and heating them together.

7. The improvement according to any one of claims 1–6 wherein said step (c) is carried out in a ratio of (c) (1) to (c) (2) 10/1–1/10, the total amount of (c) (1) and (c) (2) being 1–1,000 g based on 100 g of said solid product (II) and the reaction temperature being in a range of 30°–500° C.

8. The improvement according to claim 1 wherein said α-olefin polymers are polyethylene or a copolymer of ethylene with a small amount of propylene or butene-1.

9. The improvement according to claim 1 wherein said α-olefin polymers are polypropylene or polybutene-1.

* * * * *